United States Patent
Schaefer et al.

(10) Patent No.: US 6,284,133 B1
(45) Date of Patent: Sep. 4, 2001

(54) BIO AERATOR

(75) Inventors: William L. Schaefer, Bayport, NY (US); Leroy J. Bealer, Jr., Middletown, CT (US)

(73) Assignee: Shell Oil Company, Houston, TX (US)

( * ) Notice: Subject to any disclaimer, the term of this patent is extended or adjusted under 35 U.S.C. 154(b) by 861 days.

(21) Appl. No.: 08/557,979

(22) Filed: Nov. 13, 1995

(51) Int. Cl.$^7$ ............................................. C02F 1/74
(52) U.S. Cl. .................... 210/170; 210/220; 261/77; 261/94
(58) Field of Search .................... 210/170, 220, 210/242.2; 166/177.7; 261/77, 94, 121.1

(56) References Cited

U.S. PATENT DOCUMENTS

| | | | |
|---|---|---|---|
| 2,744,065 | * 5/1956 | Lacey | 210/220 |
| 3,846,290 | 11/1974 | Raymond | 210/11 |
| 4,872,994 | * 10/1989 | Jakob | 210/170 |
| 4,943,305 | 7/1990 | Bernhardt | 55/170 |
| 4,950,394 | 8/1990 | Bernhardt et al. | 210/170 |
| 5,080,805 | * 1/1992 | Houser | 210/170 |
| 5,221,159 | 6/1993 | Billings et al. | 405/128 |
| 5,277,518 | 1/1994 | Billings et al. | 405/128 |
| 5,332,333 | 7/1994 | Bentley | 405/128 |
| 5,358,357 | 10/1994 | Mancini et al. | 405/128 |
| 5,474,685 | * 12/1995 | Breslin | 210/170 |

FOREIGN PATENT DOCUMENTS 0 328 993 B1   8/1989   (EP).

* cited by examiner

*Primary Examiner*—Christopher Upton

(57) ABSTRACT

In typical hydrocarbon-contaminated ground water, the level of dissolved oxygen is low due to the high biological oxygen demand. The present invention increases dissolved oxygen levels in the ground water thereby increasing biological activity. The increased biological activity means that more of the dissolved hydrocarbons will be consumed at a greater rate. The instant process and apparatus for remediating dissolved hydrocarbon in ground water involves drawing ambient air down through a tubing and aeration stone into ground water by the vacuum created by a soil vapor extraction (SVE) system thereby increasing the amount of dissolved oxygen in the SVE well and in the ground water resulting in enhanced biodegradation by aerobic microbes.

5 Claims, 2 Drawing Sheets

BIO AERATOR

BACKGROUND OF THE INVENTION

1. Cross Reference to Related Applications

This application is related to Assignee's copending application Ser. No. 08/557,980 filed Nov. 13, 1995.

2. Field of the Invention

Bioremediation of dissolved hydrocarbons in ground water by increasing the amount of dissolved oxygen in the ground water resulting in enhanced biodegradation by aerobic microbes.

3. Background Art

U.S. Pat. No. 4,950,394 to Bernhardt et al relates to an arrangement for driving out volatile impurities from the ground water and from ground through which it flows. More particularly, it relates to the arrangement in which the driving out is performed by producing a negative pressure in a well shaft extending to the region of the contaminated ground water and supplying a gas, especially fresh air, underneath the water level of the well shaft. The limiting wall of the well shaft is provided, at least in the region between the air inlet and the water table, with a plurality of fine capillary openings which produce a laminar liquid flow with relatively high speed, and a greater free throughflow or passage surface than in a remaining region of the limiting wall of the well shaft.

In U.S. Pat. No. 5,332,333 to Bentley, volatile contaminants are removed from the vadose zone of contaminated earth by vacuum extraction through a borehole placed into the contaminated area. Means are provided for substantially trapping water within the extraction borehole so as to prevent contaminated water from being brought to the surface. Means are also provided for maintaining substantially atmospheric pressure at the bottom of the extraction borehole so as to prevent water from the water table from rising into the borehole and to allow improved circulation of air through the contaminated zone. Preferably the conduit is kept open and pressure is maintained by passive infiltration of atmospheric air into the bottom of the conduit but, if desired, air may be injected into the conduit by positive pressure means.

U.S. Pat. No. 5,358,357 to Mancini et al discloses a process and apparatus for high vacuum groundwater extraction in which the gas inlet is generally situated at a level below the natural water table but above the level to which the groundwater drops after the pumping process has been in operation for a period of time.

SUMMARY OF THE INVENTION

In typical hydrocarbon-contaminated ground water, the level of dissolved oxygen is low due to the high biological oxygen demand. The present invention increases dissolved oxygen levels in the ground water thereby increasing biological activity. The increased biological activity means that more of the dissolved hydrocarbons will be consumed at a greater rate. The instant process and apparatus for remediating dissolved hydrocarbon in ground water involves drawing ambient air down through a tubing and aeration stone into ground water by the vacuum created by a soil vapor extraction (SVE) system thereby increasing the amount of dissolved oxygen in the SVE well and in the ground water resulting in enhanced biodegradation by aerobic microbes.

DESCRIPTION OF THE PREFERRED EMBODIMENTS

The purpose of the invention is to cost-effectively remediate dissolved hydrocarbons in ground water by increasing the rate of biodegradation. The invention uses air-sparge-type technology to enhance already-operating soil vapor extraction (SVE) systems. Ambient air is drawn down the inlet tubing and aeration stone into the ground water by the vacuum created by the SVE system. This air current causes turbulent bubbling and frothing within the SVE well. This bubbling action increases the amount of dissolved oxygen in the SVE well which eventually diffuses into the surrounding ground water. The increased dissolved oxygen levels allow naturally-occurring aerobic microbes to metabolize dissolved hydrocarbons at a greater rate. This increases the rate of groundwater biodegradation and remediation.

The invention can be installed into any sized existing SVE well. The system consists of a standard well seal, a three component (primary, secondary and tertiary) air inlet tube, a zinc weight, an aeration stone, and a petroleum-resistant PVC float. The standard well seal is modified by drilling a hole through it to accommodate a rubber grommet seal. This grommet holds the primary inlet tubing in place and seals the hole to prevent the vacuum from drawing in air from around the tubing. Attached to the primary tubing, by a plastic elbow type barbed fitting, is the secondary coiled air inlet tubing. The secondary tubing is attached to the primary tubing at a depth of about 5 feet above the water table. The tertiary tubing is attached below the secondary coiled tubing by plastic elbow type barbed fitting and runs through a hydrocarbon-resistant float which is modified so that the tubing can be snaked through the float. At the bottom of the tertiary tubing is a zinc weight and, optionally, an aeration stone. The length of the tubing from the float to aeration stone is set according to the vacuum pressure in the SVE well as the SVE vacuum blower is operating. This is simply calculated by obtaining the vacuum pressure at the well in units of inches of $H_2O$. For example, for every one inch of vacuum the bottom end of the tertiary tube can be set 0.5 inches below the float. This depth must always be maintained because the vacuum in the well is relatively constant. The depth of the bottom end of the tertiary tube is maintained by the secondary coiled tubing which acts as a spring and will accommodate any fluctuations in the water table. The zinc weight provides the downward force necessary for the spring to stretch.

Figure 1:
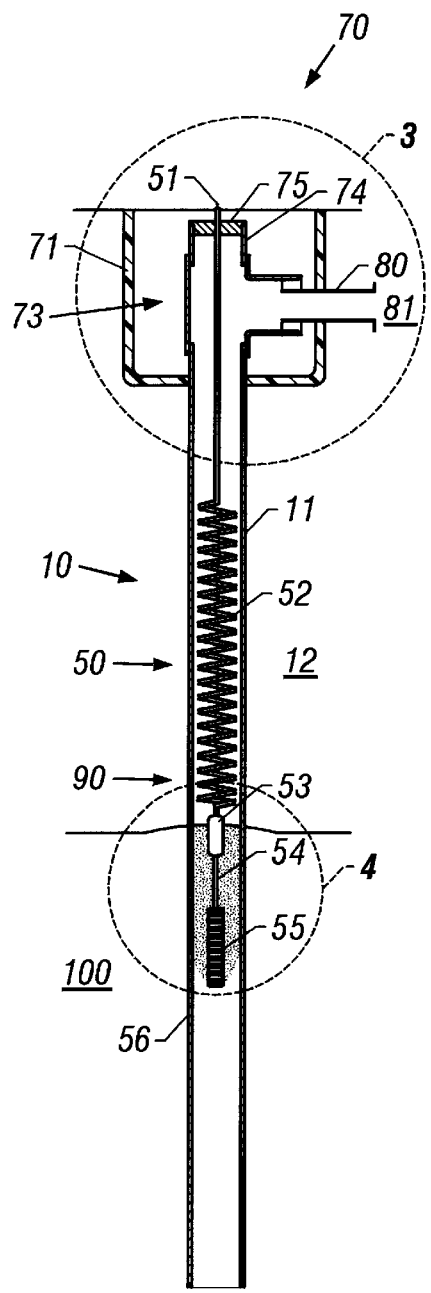
FIG. 1 is a schematic view of a typical well with the invention shown in place.
Figure 2:
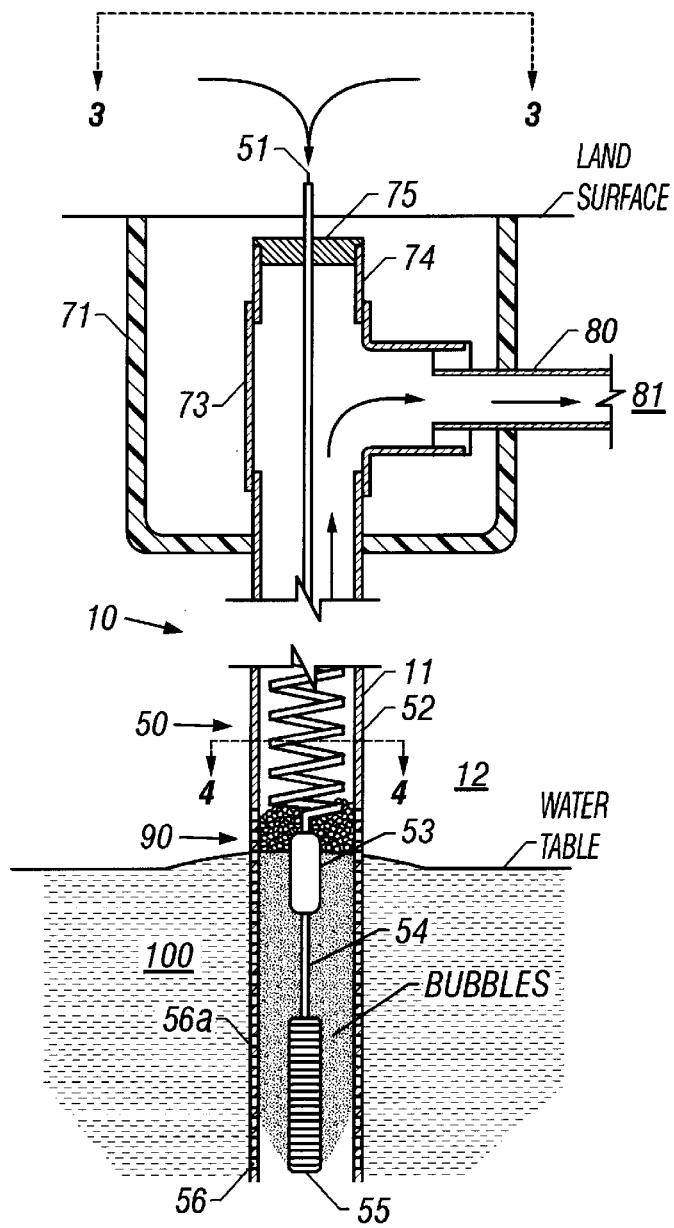
FIG. 2 is a sectional view of the invention operating in a well, the section being taken on the longitudinal axis of the well.
Figure 3:
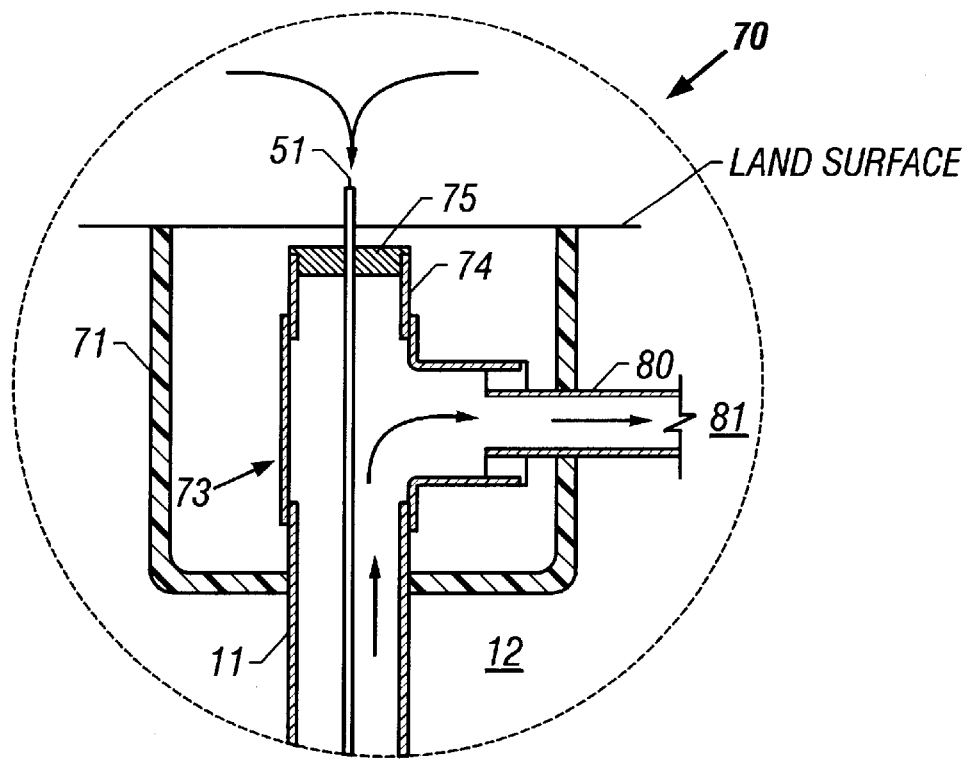
FIG. 3 is an enlarged view of the wellhead connections taken along the line 3—3 of FIG. 2.
Figure 4:
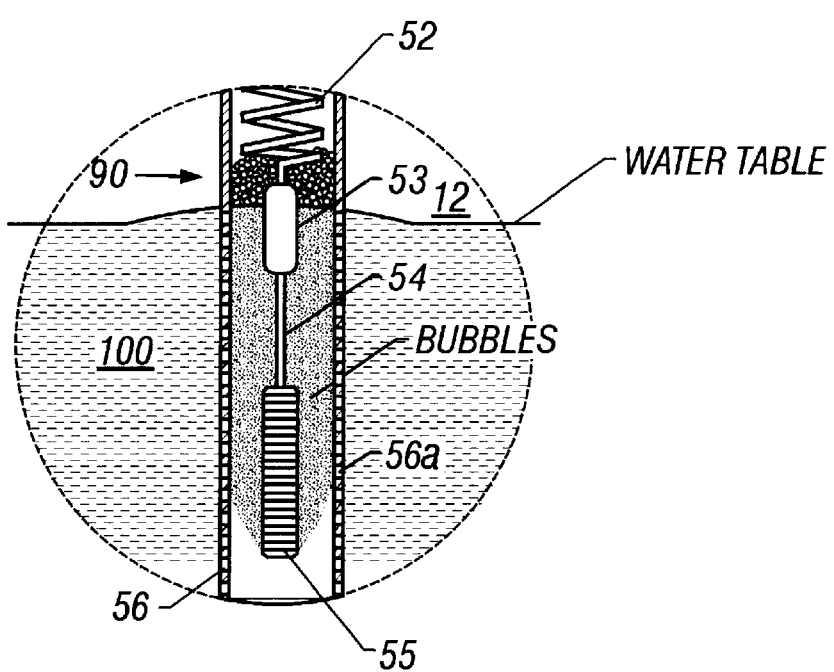
FIG. 4 is an enlarged view of the aeration section taken along the line 4—4 of FIG. 2.

Referring now to FIGS. 1 and 2 which are sectional views taken through the longitudinal axis of a monitoring well 10 penetrating a formation 12. FIGS. 3 and 4 provide enlargement of the wellhead 70 and aeration 50 section of the invention, respectively.

A well head assembly shown generally at 70 surrounds and seals the well shown generally at 10 formed by its casing 11 which may be, for example, a four (4) inch diameter schedule 40 or schedule 80 PVC pipe. The well head assembly may comprise, for example, a ten (10) inch diameter manhole or cylinder 71 into which the casing 11 extends. One leg of a three-way adapter 73 is secured to the upper end of the casing 11. An extension leg 74 is secured to a second leg of the adaptor 73 and is sealed by, for example, a four (4) inch locking gripper plug 75. The third leg of adaptor 73 is secured to an extension leg 80 which connects to soil vapor extraction (SVE) equipment 81. The casing 11 extends through the formation 12 and terminates in the ground water 100. The lower portion of the casing 11 is perforated above and below the ground water 100 to allow groundwater 100 inflow and water vapor 90 inflow from the formation 12 above the water table.

Suspended from the seal 75 inside the casing 11 is the biotreating equipment, shown generally at 50, comprising the primary air inlet tubing 51, the secondary coiled air inlet tubing 52, a PVC foam float 53, tertiary tubing 54 and aeration stone/zinc weight 55.

In operation, the SVE blower 81 creates a negative pressure inside the casing 11 which draws ambient air into the air inlet tubing 51. The ambient air exits through the bottom of the tertiary tubing 54, or through aeration stone 55, causing bubbles and frothing in the ground water which has entered the casing 11 through the perforations in the well screen 56.

The SVE equipment 81 comprises at least a blower for providing a negative pressure of about 12 inches $H_2O$, for example. The effluent vapors withdrawn from the ground water 100 and from water vapor 90 (in the formation 12 above the water table) may be further treated (if necessary) prior to release to the atmosphere.

The primary air inlet tubing 51 may comprise, for example, any gasoline-resistant flexible tubing. The primary air inlet tubing 51 is attached by a gasoline-resistant plastic elbow type barbed fitting to the secondary coiled air inlet tubing 52 which comprises, for example, a gasoline-resistant coiled tubing such as those used with pneumatic tools.

The coiled tubing 52 is then attached to tertiary tubing 54 which, in turn is slidingly attached to a PVC foam float 53 by simply snaking the tubing 54 through the float 53. Tubing 54 is held in place on the float 53 by gasoline-resistant plastic grommets. A PVC foam float is preferred because it is resistant to gasoline and will not become saturated and sink. The float can be adjusted by sliding it on the tubing and readjusting the grommets. The secondary tubing 52 is attached to tertiary 54 by a gasoline-resistant plastic elbow type barbed fitting. Tubing 54 may then optionally terminate in an aeration stone 55. The aeration stone 55 may be identical to those used in home aquariums. The stone creates fine bubbles which enable the oxygen to dissolve more effectively i.e., it increases the rate at which oxygen dissolves into the ground water. The aeration stone is not absolutely necessary to create bubbles, it only makes them finer. The apparatus is still effective even without the aeration stone. Therefore, using the aeration stone is optional, but preferred.

The zinc weights are anticorrosion devices such as those used on marine outboard motors. They are threaded so they can be replaced seasonally, however, the thread holes are easily drilled out so that the weights may be held in place on the tertiary tubing by sliding the tertiary tubing through the drilled out weights. Zinc weights are preferred because when they corrode, the oxidized zinc will not clog the perforated well screen 56. In addition, they are inexpensive and easy to work with. Other weights could be used, however, such as lead, but regardless, a weight is required to provide the downward force on the tubing and keep it in the ground water.

What is claimed is:

1. An apparatus for treating contaminated ground water comprising:

tubing means adapted to be suspended in a well such that, when suspended in a well, the upper end of said tubing is above ground and is open to the atmosphere, and the lower end of said tubing extends into said ground water;

said tubing means having a coiled portion, which serves as a spring, which coiled portion, when said tubing is suspended in a well, does not extend to said ground water;

a further extension of said tubing means continuing below said coiled portion, said further extension terminating in said ground water;

float means adapted to be slidingly attached to said tubing means below said coiled portion;

aeration means attached to the lower end of said tubing means; and weight means fixedly attached to the lower end of said tubing means below said aeration means.

2. The apparatus of claim 1 wherein said aeration means is made of stone.

3. The apparatus of claims 1 wherein said weight means is made of a metal selected from the group of metals consisting of lead and zinc.

4. The apparatus of claim 3 wherein said weight means is made of zinc.

5. The apparatus of claim 1 further comprising:

sealing means, sealingly attached to said upper end of said tubing means, for sealing said well and suspending said tubing means therefrom.

\* \* \* \* \*